United States Patent Office 2,839,586
Patented June 17, 1958

2,839,586

MANNICH BASE SYNTHESIS OF BISPHENOLS

Henry E. Fritz, South Charleston, W. Va., assignor to Union Carbide Corporation, a corporation of New York No Drawing. Application May 23, 1956
Serial No. 586,647

6 Claims. (Cl. 260—619)

This invention relates to a new method for preparing polyphenylols and particularly bisphenols.

Bisphenols have heretofore been prepared by the reaction of monohydric phenols with ketones or aldehydes in the presence of acid catalysts. These methods have been satisfactory where a single phenol has been used in the reaction but have led to low yields when mixtures of phenols were present in the reaction mixture. These low yields are probably due to the fact that the phenols in the mixture have different reaction rates; therefore, the more reactive phenols form high molecular weight resins before the initial reaction of the less reactive phenols has started.

Because of the fast growing interest in and demand for polyphenylol compounds, a satisfactory method for producing such compounds from simple monohydric phenols or mixtures of phenols is desirable. Such a process will make it possible to use phenolic mixtures, as obtained by coal hydrogenation and other synthetic processes, in the preparation of bisphenols without going through the expensive and difficult distillations necessary to separate the various phenols from each other.

I have now found that bisphenols or polyphenylols can be prepared by reacting a Mannich base of a monohydric phenol with a quantity of a monohydric phenol or a mixture of monohydric phenols at least equivalent to the number of Mannich groups present in the Mannich base at a reaction initiating temperature. It is to be understood that the Mannich bases of this invention are those prepared with a monohydric phenol, and by the term Mannich base is means the mono-, di- or tri-Mannich bases of a monohydric phenol.

The Mannich bases suitable for the purposes of this reaction are those prepared from monohydric phenols which possess at least one unhindered active position; the active positions being ortho and para to the hydroxyl group. Those phenols having two of said positions blocked, either by substituents thereon or by hindrance caused by neighboring groups will form mono-Mannich bases solely. When only one ortho or the para position is blocked or hindered it is possible to obtain both mono- and di-Mannich bases; and if the para and both of the ortho positions are open mono-, di- and tri-Mannich bases can be obtained by varying the concentrations of the reactants and the conditions of the reaction. The preparation of these Mannich bases is well known and is clearly discussed in "Organic Reactions," vol. I, J. Wiley and Sons, Inc., New York, N. Y., 1942, pp. 303–341.

Illustrative of the monohydric phenols suitable for preparing the Mannich bases useful in this invention are phenol, the ortho-, meta- and para-cresols, p-methoxy phenol, the ethyl phenols, p-chlorophenol, the xylenols such as the 2,3-, 2,4-, 2,5-, 2,6-, 3,4- and 3,5-xylenols, 2-propylphenol, 2,4-di-t-butyl-5-ethylphenol, 2-t-butyl-4,5-dimethylphenol, 2,5-dimethyl-4-t-butylphenol and 6-t-butyl-5-indanol, or mixtures thereof.

The Mannich base is reacted at an elevated temperature usually above about 90° C., with at least an equimolar amount of a monohydric phenol per Mannich group, said phenol having at least one unhindered active position; the active positions being ortho and para to the hydroxyl group. Suitable phenols include the monohydric phenols previously described as being useful in the preparation of the Mannich base or mixtures thereof.

The Mannich group

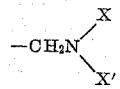

of the Mannich base, which is attached to the monohydric phenol, wherein X and X' taken separately can be a lower alkyl group or a phenyl group, and taken collectively can be a cycloaliphatic ring containing up to about 5 carbon atoms or a —$CH_2CH_2OCH_2CH_2$— group, is capable of reacting at any unhindered active ortho or para position of a monohydric phenol. Thus for example a monohydric phenol having two ortho positions or one ortho position and the para position blocked or hindered can react with only one mole of a Mannich base; a monohydric phenol having only one ortho or the para position blocked or hindered can react with either one or two moles of Mannich base at the unhindered active ortho or parapositions, while a monohydric phenol having all three ortho and para positions active can react with one, two or three moles of Mannich base depending on the concentrations of the reactants charged and the reaction conditions. Also, a mono-Mannich base, that is one containing only one Mannich group in the molecule, can react with only one reactive monohydric phenol molecule, whereas di- and tri-Mannich bases can react with two and three moles of reactive phenol respectively. To further illustrate the point, a monohydric phenol can react with one Mannich group for each reactive and unhindered position present in the phenol; similarly each Mannich group present in the Mannich base can react with one mole of a monohydric phenol.

Thus it can readily be seen that the theoretical ratio of phenol:Mannich base can be varied within the range of from 1:3 to 1:1. However, because of the nature of the reaction it is preferred to use a larger excess of phenol to Mannich base and ratios as high as 10:1 have been successfully used. Polyphenylols can also be obtained using ratios less than 1:1 but this would not be economically practical since the reaction is one which theoretically reacts in stoichiometric quantities.

Ratios greater than about 10:1 can be employed if desired. It has been found that at ratios of about 10:1 the main product obtained by the reaction of a monohydric phenol with a mono-Mannich base of a monohydric phenol is the bisphenol. As this ratio is decreased the yield of bisphenol decreases and the yield of higher molecular weight polyphenylols increases. Thus by varying the ratios one can change the composition of the polyphenylol obtained and if one is interested in reacting the Mannich base with but one mole of active and unhindered phenol then a large excess of phenol is used.

The reaction between the phenol and the Mannich base is usually carried out at a temperature above about 90° C. and below about 350° C., preferably between about 100° and 250° C. Temperatures below about 90° C. unduly prolong the reaction time, while temperatures above about 350° C. may lead to excessive decomposition of reactants and product. If desired the condensation can be carried out under a partial vacuum or at a superatmospheric pressure; but I have found that satisfactory products are obtained at atmospheric pressure. Also, in order to eliminate the possibility of oxidation, which results in undesirable color formation in the polyphenylol condensation product, the reaction can be conducted in an inert atmosphere; nitrogen, natural gas and carbon dioxide being suitable gases for this purpose.

The reaction time cannot be rigidly defined since it is dependent on many factors, such as the reactivities of the particular Mannich base and phenol employed, and the temperature and pressure selected for the reaction. It has been found that at atmospheric pressure a period of about 10 hours at a temperature above about 100° C. is usually sufficient to give a practical yield of polyphenylol.

The condensation of the Mannich base with the phenol can be conducted in the absence of added solvent, wherein the excess phenol acts as solvent, or if desired, with a solvent. As solvent one can use a high boiling hydrocarbon such as naphthalene, or crude petroleum distillation cuts which do not partake in the reaction or in any way interfere with it.

The Mannich base can be prepared directly in the reaction vessel by reacting a portion of the active and unhindered phenol therein with the formaldehyde and the secondary amine, or it can be previously prepared and then charged to the phenol and reacted therewith. The phenol used need not be the same as the phenol of the Mannich base. By the methods of this invention it is possible to prepare mixed polyphenylols in high yields.

In short, the invention concerns the reaction of a Mannich base of a monohydric phenol with a monohydric phenol at a temperature of above about 90° C. to yield polyphenylol derivatives.

The invention is further illustrated by the appended examples.

*Example 1*

A Pyrex three-necked flask equipped with a stirrer, thermometer, reflux condenser and a dropping funnel was charged with 1880 g. of U. S. P. phenol. At a temperature of 40–45° C. and over a ½ hour period there was added 146 g. of diethylamine while stirring the reaction mixture. Then over a 1 hour period during which the temperature was permitted to drop to 20–25° C. there was added 168 g. of a 37% aqueous formaldehyde solution. After addition was complete the reaction mixture was stirred an additional two hours at about 20–30° C. to insure complete reaction of the diethylamine and formaldehyde with the phenol to form the Mannich base. The dropping funnel was replaced by distillation head with a condenser and the reaction mixture was heated and stirred over a period of about 10 hours at the boiling point of the reaction mixture so as to maintain a continual light reflux to a final pot temperature of about 268° C. at atmospheric pressure. During this period water which had formed during the preparation of the Mannich base, diethylamine which had reformed during the condensation of the Mannich base with the phenol to produce the polyphenylol and unreacted phenol were removed and collected as a distillate. The residue in the flask cooled to a tan semi-solid viscous liquid. Yield was 393 g. representing a 98.5% yield of crude bisphenols based on the formaldehyde charged. The product was readily soluble in ether and 10% sodium hydroxide solution, but only slightly soluble in benzene. Neutral equivalent was 99.2 (average of 3 runs) as compared to a calculated value of 100. Microanalysis showed the absence of nitrogen in the product. Molecular weight as determined by the freezing point depression of nitrobenzene was 236, this compares to a calculated value of 200 for the bisphenylol and indicates the possible presence of polyphenylols higher than bisphenol.

*Example 2*

Charged 2460 g. of a mixture commercially known as "Meta Phenols 220," consisting of about 13% by weight of mono-methyl-phenols, about 30.5% by weight of dimethylphenols, about 25% by weight of mono-ethylphenols and about 29% by weight of unidentified phenols to the apparatus described in Example 1. Over a ½ hour period there was added 146 g. of diethylamine with stirring at about 20° to 25° C. Then, while cooling externally to maintain the temperature at about 25° C. there was added 168 g. of a 38% aqueous formaldehyde solution over a 1 hour period. Stirred another 2 hours at about 25° C. to insure complete conversion of the amine to the Mannich base. The dropping funnel was replaced by a distillation head with a condenser and the reaction mixture was heated and stirred over a period of about 6 hours at the boiling point of the reaction mixture so as to maintain a continual slight reflux to a final pot temperature of about 200° C. During this period a distillate of water, diethylamine and unreacted phenols was recovered as described in Example 1. The balance of the unreacted phenols was stripped from the residue in the pot at a pressure of about 10 to 12 mm. of mercury and at a pot temperature of from 110° to 200° C. On cooling to room temperature a brown resinous solid was obtained which weighed 464 g. and represented a 90% by weight yield of bisphenols based on the weight of formaldehyde charged. This product was readily soluble in ether, benzene and 10% sodium hydroxide solution. The neutral equivalent was 129.8 (average of 3 runs) as compared to a calculated value of 129. Microanalysis showed the absence of nitrogen in the product. Molecular weight as determined by the freezing point depression of benzene was 254, this compares to a calculated value of 258 for the mixed bisphenols obtainable from the mixture of Meta Phenols 220 charged.

*Example 3*

Charged 122 g. of 2,6-dimethylphenol to the apparatus described in Example 1. At 20–30° C. added 80 g. of diethylamine. Then at 20°–30° C. over a ½ hour period added 91 g. of a 37% aqueous formaldehyde solution. Stirred at room temperature 2 hours to assure complete conversion to 2,6-dimethyl-4-diethylaminomethylphenol. The dropping funnel was replaced by a distillation head with a condenser. Added 1080 g. of 4-methylphenol and heated and stirred over a period of about 9 hours at the boiling point of the reaction mixture so as to maintain a continual slight reflux to a final pot temperature of 205° C. During this period a distillate of water, diethylamine and excess 4-methylphenol was recovered as described in Example 1. Then the excess unreacted 4-methylphenol was removed by vacuum distillation at 7 to 9 mm. of mercury at a pot temperature of from about 92° to 206° C. The dark crude crystalline product remaining in the still represented a quantitative yield of 2,4′-dihydroxy-5,3′,5′-trimethyldiphenylmethane. A portion was recrystallized several times from boiling hexane and the white crystals melted at 104° C.

*Microanalysis.*—Calcd. for $C_{16}H_{18}O_2$: C, 79.30; H, 7.49; neutral equivalent 121.1. Found: C, 79.44; H, 7.59; neutral equivalent 122.

*Example 4*

Charged 2166 g. of p-cresol to the apparatus described in Example 1. At 35° C. added 146 g. of diethylamine over a ½ hour period. Then at about 30° to 35° C. added 168 g. of a 37% aqueous formaldehyde solution. Stirred at room temperature for about 2 hours to assure complete conversion to the Mannich base. Replaced the dropping funnel by a distillation head with a condenser. Then heated and stirred over a period of about 3 hours at the boiling point of the reaction so as to maintain a continual slight reflux to a final pot temperature of 200° C. During this period a distillate of water, diethylamine and excess p-cresol was recovered as described in Example 1. Then the excess unreacted p-cresol was removed by vacuum distillation at 9 to 12 mm. of mercury to a final pot temperature of 235° C. The dark crude residue crystallized slowly and weighed 427 g., representing a 94% yield. Distillation of the crude at 1.4 to 1.8 mm. of mercury at 190° to 200° C. resulted in partial decomposition. A portion of the redistilled 2,2' - dihydroxy - 5,5' - dimethyldiphenylmethane was recrystallized from cyclohexane and the crystals melted at 126°–127° C.

*Microanalysis*—Calcd. for $C_{15}H_{16}O_2$: C, 78.94; H, 7.06; neutral equivalent 114.1. Found: C, 79.07; H, 7.16; neutral equivalent 109.3.

Example 5

A Pyrex three-necked flask equipped with a stirrer, thermometer and a distillation head with a condenser was charged with a mixture of 38 g. of 6-t-butyl-5-indanol and 50 g. of 4-dimethylaminomethyl-6-t-butyl-5-indanol. Heated and stirred at 195°–210° C. for about 12 hours, during which the dimethylamine evolved was removed by distillation. The crude bis(5-hydroxy-6-t-butyl-4-indanyl)-methane represented a quantitative yield. Repeated recrystallizations, from boiling hexane gave white crystals melting at 203° C.

*Microanalysis*—Calcd. for $C_{27}H_{36}O_2$: C, 82.60; H, 9.24. Found: C, 82.76; H, 9.17.

Example 6

A Pyrex three-necked flask equipped with a stirrer, thermometer and a distillation head with a condenser was charged with a mixture of 5.7 g. of 4-dimethylaminomethyl-2,6-dimethylphenol and 8 g. of 2,6-dimethylphenol. The reaction was heated with stirring at about 200° C. for about 1 hour. The hot mixture was poured into 150 ml. of hexane at room temperature and then allowed to stand to crystallize. Filtered and dried; yield was 8.1 g. of crystalline bis-(4-hydroxy-3,5-dimethylphenyl)-methane melting at 169°–175° C. A portion was recrystallized from cyclohexane to obtain an analytically pure sample which melted at 175.5°–176.5° C.

*Microanalysis*—Calcd. for $C_{17}H_{20}O_2$: C, 79.65; H, 7.86; neutral equivalent, 123.2. Found: C, 79.86; H, 7.92; neutral equivalent, 127.5 (average of 2 runs).

Example 7

A Pyrex three-necked flask equipped with a stirrer, thermometer and a distillation head with a condenser was charged with 10 g. of 4-dimethylaminomethyl-6-t-butyl-5-indanol and 100 g. of p-cresol. The reaction was heated to maintain a slight reflux and stirred at the reflux temperature for about 8 hours. The excess unreacted p-cresol was distilled off at a pressure of 5 mm. of mercury leaving 15 g. of a dark, reddish oil. The oil was dissolved in boiling hexane and the solution let stand to cool. Long, straw colored needles of (2-hydroxy-5-methylphenyl) (5-hydroxy-6-t-butyl-4-indanyl) methane were obtained which melted at 160° C. An analytically pure sample was also prepared.

*Microanalysis*—Calcd. for $C_{21}H_{26}O_2$: C, 81.25; H, 8.44; neutral equivalent, 155.2. Found: C, 81.33; H, 8.49; neutral equivalent, 314.5 (average of 2 runs).

In obtaining the neutral equivalent it was found that only one of the phenolic hydroxyl groups is titratable, the second hydroxyl group may be affected by the large group located ortho to it.

What is claimed is:

1. The method of producing polyphenylols, which comprises reacting a Mannich base of a monohydric phenol with at least one equivalent, per Mannich group present in the Mannich base, of monohydric phenols, said monohydric phenols having at least one active unhindered position and said positions being ortho and para to the hydroxyl group, at a temperature of from about 90° C. to about 350° C. for a period of time sufficient to obtain reaction between the reactants and formation of the polyphenylol.

2. The method of producing polyphenylols, which comprises reacting a Mannich base of a monohydric phenol with from about 1 to about 10 moles of a monohydric phenol, per mole of Mannich group present, said phenol having at least one active unhindered position, said active positions being ortho and para to the hydroxyl group, at a reaction temperature of from about 90° C. to about 250° C.

3. The method of producing polyphenylols, which comprises preparing a mixture of one mole of a Mannich base of a monohydric phenol with from about 1 to about 10 moles of a mono hydric phenol, per mole of Mannich group present in said Mannich base, and heating and stirring said mixture at a reaction initiating temperature of from about 90° C. to about 350° C. to cause said mixture to react and produce said polyphenylols while at the same time removing from the reaction zone the amine and other by-products formed during said reaction.

4. The method of producing polyphenylols, which comprises reacting a mono-Mannich base of a monohydric phenol with at least one equivalent of monohydric phenols, said monohydric phenols having at least one active unhindered position and said positions being ortho and para to the hydroxyl group, at a temperature of from about 90° C. to about 350° C. for a period of time sufficient to obtain reaction between the reactants and formation of the polyphenylol.

5. The method for producing polyphenylols, which comprises reacting a di-Mannich base of a monohydric phenol with at least one equivalent, per Mannich group present in the Mannich base of monohydric phenols, said monohydric phenols having at least one active unhindered position and said positions being ortho and para to the hydroxyl group, at a temperature of from about 90° C. to about 350° C. for a period of time sufficient to obtain reaction between the reactants and formation of the polyphenylol.

6. The method for producing polyphenylols, which comprises reacting a tri-Mannich base of a monohydric phenol with at least one equivalent, per Mannich group present in the Mannich base, of monohydric phenols, said monohydric phenols having at least one active unhindered position and said positions being ortho and para to the hydroxyl group, at a temperature of from about 90° C. to about 350° C. for a period of time sufficient to obtain reaction between the reactants and formation of the polyphenylol.

References Cited in the file of this patent

UNITED STATES PATENTS 1,679,312    Landt  ---------------- July 31, 1928

OTHER REFERENCES

Decombe: Chem. Abstracts, vol. 27 (1933), page 2941 (1 page).

Organic Reactions, vol. 1 (1942), page 311 (1 page), pub. by John Wiley and Sons, New York.